United States Patent [19]

Tsutsumi

[11] Patent Number: 4,894,197
[45] Date of Patent: Jan. 16, 1990

[54] METHOD FOR RUNNERLESS INJECTION MOLDING SYNTHETIC RESIN BY INTERMITTENT COOLING SYSTEM AND APPARATUS THEREOF

[75] Inventor: Shigeru Tsutsumi, Tokyo, Japan

[73] Assignee: Sanri Kabushiki Kaisha, Tokyo, Japan

[21] Appl. No.: 172,717

[22] Filed: Mar. 23, 1988

[30] Foreign Application Priority Data

Mar. 26, 1987 [JP] Japan .................................. 62-70414

[51] Int. Cl.[4] .......................................... B29C 45/72
[52] U.S. Cl. ............................ 264/297.2; 264/328.14; 264/328.15; 425/548; 425/549; 425/588
[58] Field of Search ........... 264/297.2, 328.14, 328.15; 425/547, 548, 549, 562, 588, 570, 572

[56] References Cited

U.S. PATENT DOCUMENTS 4,438,064  3/1984  Tsutsumi ....................... 264/328.15

FOREIGN PATENT DOCUMENTS 162438  10/1985  European Pat. Off. ............ 425/549
2109296  6/1983  United Kingdom ........... 264/328.15

Primary Examiner—Jan H. Silbaugh
Assistant Examiner—Jill L. Heitbrink
Attorney, Agent, or Firm—Gifford, Groh, Sheridan, Sprinkle and Dolgorukov

[57] ABSTRACT

A runnerless method for injecting and molding a synthetic resin through a gate wherein a molten resin is intermittently cooled to solidification using a cooling medium to close the door for every injecting and molding operation of a molten resin in the gate, and relates also to a novel runnerless apparatus for injecting and molding a synthetic resin provided with a metal mold mechanism composed of a plural number of component members, in which the passage for the molten resin including a runner, the gate, and a cavity are drilled, a cooling medium-employing intermittent cooling mechanism for intermittently cooling the gate thereby enabling solidification of the molten resin in the gate, a mechanism for continuously applying heat to the gate for melting an existing resin, and an injection mechanism.

6 Claims, 8 Drawing Sheets

METHOD FOR RUNNERLESS INJECTION MOLDING SYNTHETIC RESIN BY INTERMITTENT COOLING SYSTEM AND APPARATUS THEREOF

BACKGROUND OF THE INVENTION (1) Field of the Invention

The present invention relates to a method for runnerless injection molding of a synthetic resin by an intermittent cooling system and an apparatus thereof.

(2) Description of the Prior Art

Methods for runnerless injection molding of a synethic resin and the apparatus thereof include an apparatus called "Spear System" as the registered trade name, and a method using the apparatus developed by the inventor.

The conventional apparatus is provided with an intermittent heating mechanism, which is capable of local heating of a gate. In the runnerless injection molding apparatus the molten synthetic resin is continuously injection-molded by an injection mechanism, with the intermittent heating mechanism the resin which has cooled and solidified in the gate to shut the gate is intermittently heated for every molding operation to be molten, whereby the gate is opened for enabling the injection of the molten resin into cavities. With the apparatus, the heating operation of the intermittent heating mechanism is stopped immediately after the finish of the injection molding operation to permit cooling solidification of the resin in a minute amount in the gate, and the gate is shut for performing several operations such as mold-opening and removal of the molded product. This prevents the leakage of the molten resin whereby a highly precise product free of sprue runners can continuously be molded.

The above-described "Spear System" necessitates electric control by means of a heater because it performs both gate-opening and closing operations in the case of local melting and solidification of a minute amount of a resin by means of the intermittent heating means of an intermittent heating mechanism and the heater means may be of a small scale because it aims at a minute amount of the resin in the gate. In spite of the above advantage, several problems are encountered for reducing costs such as indispensability of expensive electric parts e.g. a transformer for electric control and a controller for intermittent heating.

SUMMARY OF THE INVENTION

In the present invention practiced by taking the above point into consideration, an intermittent cooling means in which the gate is intermittently cooled is employed basically, instead of the above intermittent heating means, thereby eliminating intermittent electric control by a heater and expensive controller installations. The invention provides a simple, accurate opening and closing of the gate by means of intermittent transfer of a cooling medium.

The result is a runnerless method for injecting and molding a sythetic resin in a gate wherein a molten resin is intermittently cooled to solidification using a cooling medium to close the door for every injecting and molding operation of a molten resin in the gate. The present invention relates also to a novel runnerless apparatus for injecting and molding a synthetic resin provided with a metal mold mechanism composed of a plural number of component members in which the passage for the molten resin including a runner, the gate, and a cavity are drilled, and which includes a cooling medium-employing an intermittent cooling mechanism for intermittently cooling the gate thereby enabling intermittent solidification of the molten resin in the gate, as well as with a mechanism for melting the resin by continuously applying heat to the gate, and an injection mechanism.

A desired synthetic resin material is first molten by the resin melting mechanism, which is retained in a state where the action of the injection mechanism enables injection and transferring of a desired amount of the resin.

In the mold-compacting state, the metal mold mechanism is composed of a flow path including a runner and a gate for the cavity. The flow path is heated including the gate and the molten resin is never cooled and solidified in this state.

Accordingly, when the action of the injection mechansim is started in a condition where the inside of the flow path is filled with the molten resin, the molten resin according to the injected amount thereof is injected into the cavity through the flow path via the runner and the gate to fill the cavity and thereafter undergoes rapid cooling action.

Because of the action of the cooling medium-employing intermittent cooling mechanism, a minute amount of the molten resin in the gate is rapidly subjected to cooling action to partially and locally solidify the resin in the gate thereby closing the so-called gate, resulting in complete interruption of circulation of the molded resin in the cavity to enable cooling and solidification thereof.

A desired molded product can subsequently be obtained by a known mold-opening operation.

When the mold-compacting operation is performed again after removal of the molded product, the feeding of the cooling-medium into the gate by means of the cooling-medium, intermittent cooling mechanism is stopped, and the cooled and solidified resin in the gate becomes molten again because of the heating action, and opens the so-called gate. Because the so-called gate is opened, the injection operation is possible, enabling repeated operations of injection and molding the same as the above.

DETAILED DESCRIPTION OF THE INVENTION

Embodiments of the present invention are described in detail with respect to the drawings.

Two embodiments in basic structures are described with reference to FIGS. 1 and 2.

A metal mold 4 connected to an injection mechanism provided with a conventional, known, resin-melting mechanism 1 (not shown) is composed of a fixed metal mold 3 and a movable metal mechanism 4, and is provided with a manifold 2. A numeral 5 denotes the flow path of the molten resin, in which a branched flow path 6 and a runner 7 are bored and in communication with a cavity 9 from a gate 8.

Figure 1:
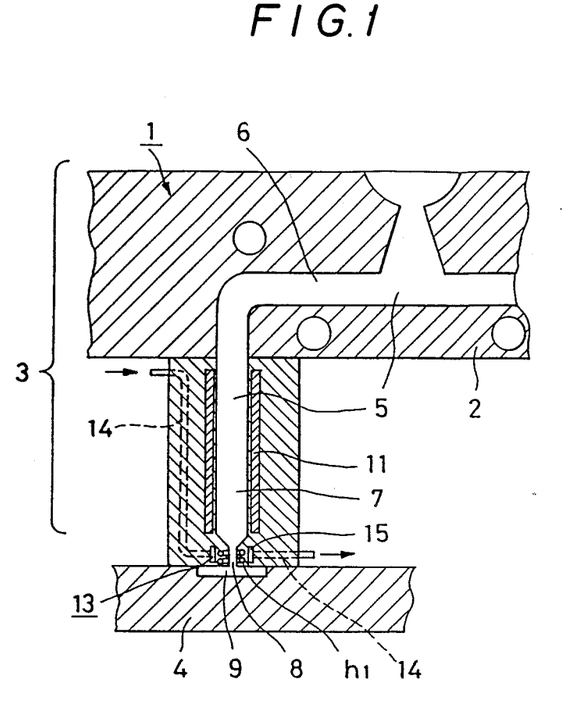
FIGS. 1 and 2 are the cross-sectional views of the main portion structure of two embodiments showing the basic, concrete configuration for effecting a method for runnerless, injection molding in the present invention.

FIG. 1 illustrates a case where gate heating means for locally heating the gate 8 is employed as an external heating system, in which a heater $h_1$ annularly surrounding the gate 8 is arranged. FIG. 2 illustrates a case where gate heating means for locally heating the gate 8 is employed as an internal heating system, in which a heater $h_2$ is arranged at the front end of a conical tip 10 arranged in a runner 7 to be capable of heating outward from the center thereof.

Figure 2:
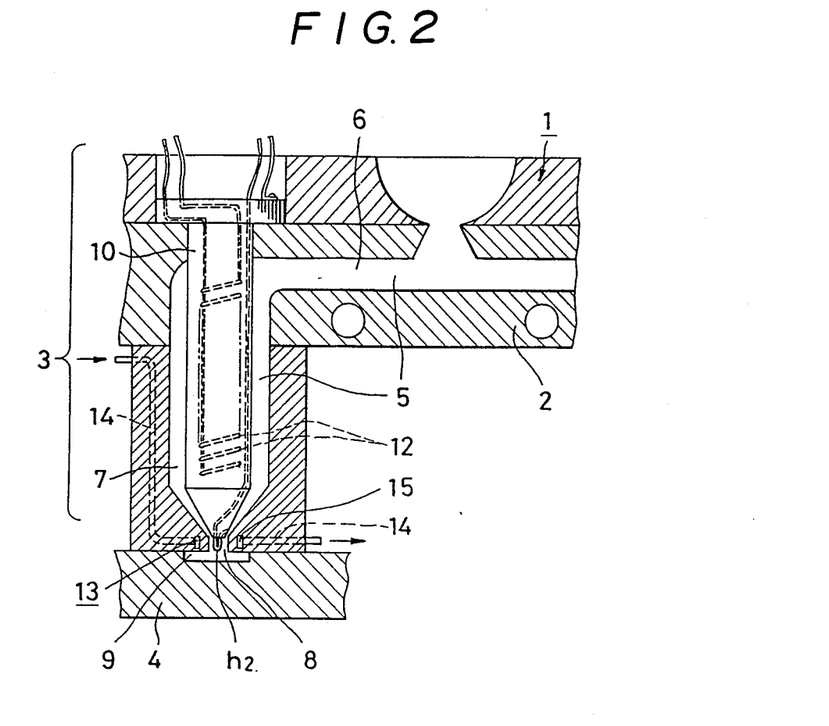
Figure 3:
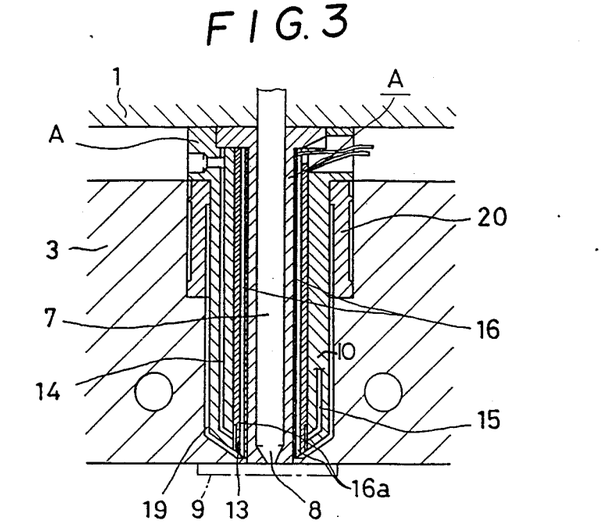
FIGS. 3, 5 and 7: main portion cross-sectional views illustrating three embodiments.
Figure 4:
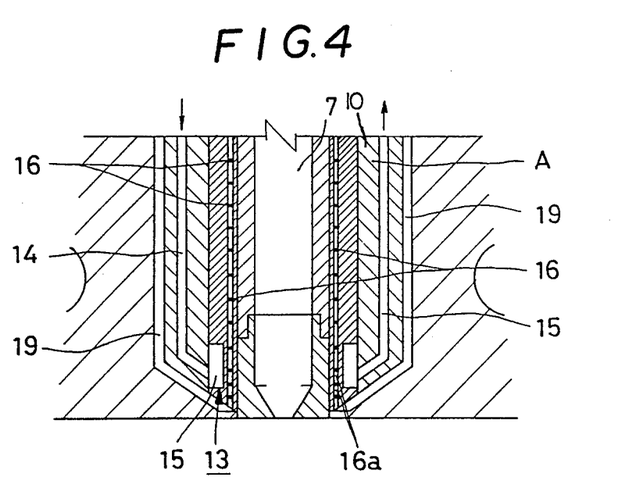
FIGS. 4, 6 and 8: main portion-enlarged cross-sectional views corresponding to the above FIGS. 3, 5 and 7.
Figure 5:
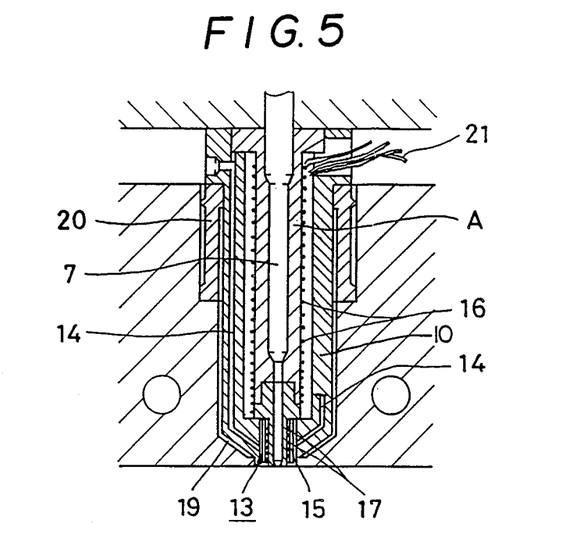
Figure 6:
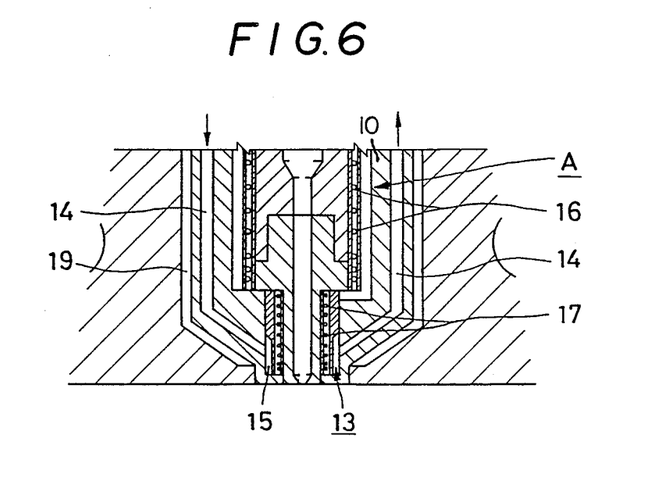
Figure 7:
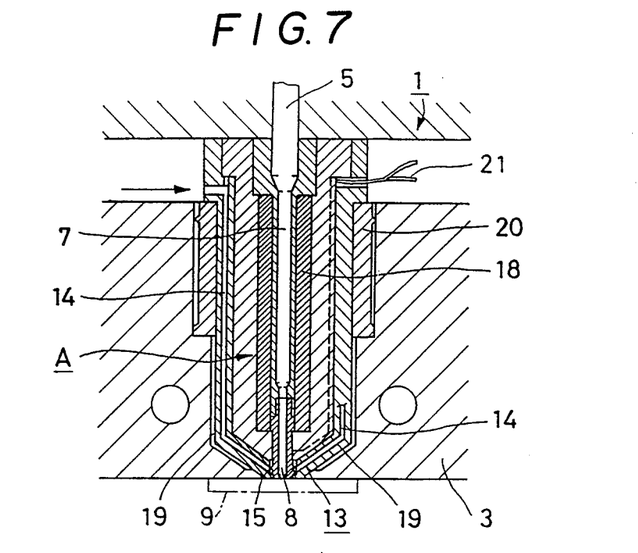
Figure 8:
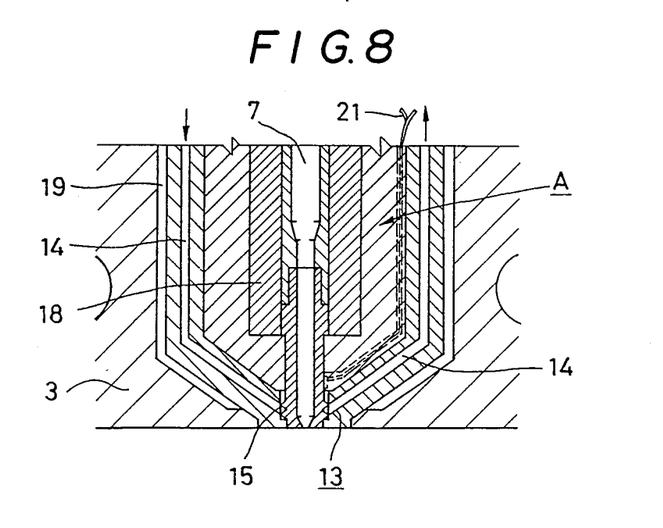
Figure 9:
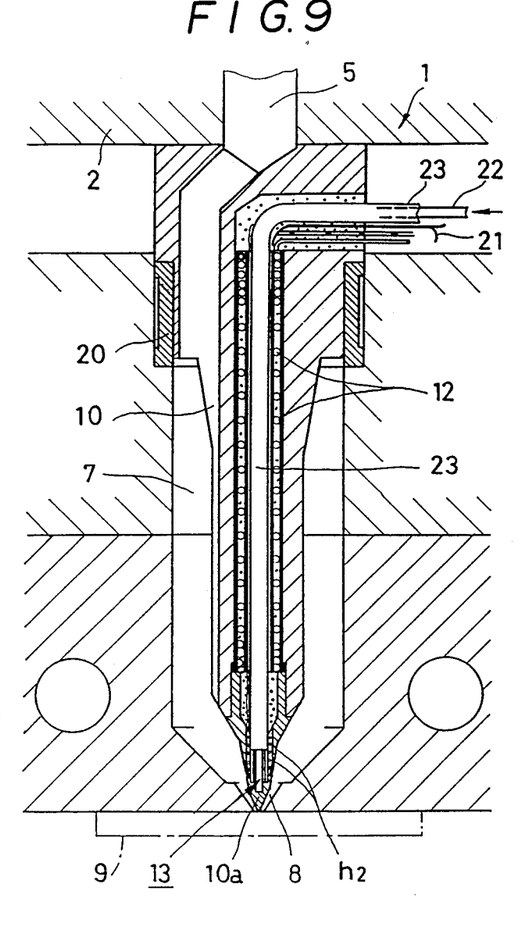
FIGS. 9 and 11: main portion cross-sectional views illustrating still other two embodiments.

The heating and heat insulation of the runner 7 is performed by a heater 11 embedded in the outer periphery thereof in FIG. 1 and by a heater 12 contained in the tip in FIG. 2.

In a cooling medium-employing intermittent cooling mechanism 13 formed in the outer periphery of the gate 8, the vent 14 for air and other cooling media provided on a metal mold 3 is connected to a ring-like gate cooling portion, viz. a cooling passage 15 provided on the outer periphery of the gate 8 for enabling intermittent feeding of the cooling medium into the cooling passage using pressurizing means such as a compressor. The cooling medium-employing intermittent cooling mechanism 13 can intermittently be operated for every injection molding operation.

The exhausting port of the vent 14 may be directed as well toward the atmosphere.

A method for injection molding is described based on the above structure.

A desired material resin is heated and molten by the resin-melting mechanism (not shown) of a synthetic resin as in the case with conventional injection molding method.

The molten resin is fed into the flow path 5 by an injection mechanism (not shown) and then heated and insulated by a heater contained in a metal mold mechanism 1 to retain the molten condition.

Under a mold-compacting condition, the gate 8 is heated by a heater $h_1$, or $h_2$ to heat and melt the resin in the gate 8 thereby keeping the gate open to operate the injection mechanism.

A desired amount of the molten resin is transferred through the flow path 6, via the runner 7 to the cavity 9.

During the initial process and after completion of the injection operation by means of the injection mechanism, water and another suitable cooling medium is fed by means of the cooling medium-employing intermittent, cooling mechanism 13 into the gate 8 and the ring-shaped cooling flow path 15 surrounding the gate 8 from the vent 14 using a pressurizing means such as a pump. In this case, the gate 8 rapidly lowers the temperature irrespective of being continously heated by the heater $h_1$ or $h_2$ to render the molten resin in the gate 8 semi-solid or solid thereby being capable of closing the so-called gate.

Accordingly, a highly precise molded product can be obtained from the filled material resin without resulting in inconveniences such as dent as well as the back-flow in the cavity 9 into the runner 7.

After cooling and solidification of the resin in the cavity 9, mold-opening operation is performed thereby enabling removal of the molded product. Because the gate 8 is kept closed due to the semi-solidified and solidified resin in this case, no pendulous efflux is produced, therefore the subsequent molding operation shall not be hindered for that reason. If the action of the cooling mediumemploying intermittent cooling mechanism 13 is stopped after removal of the molded product and prior to the moldcompacting operation and the subsequent injection operation, the cooled and solidified resin in the gate 8 is immediately heated and molten to open the so-called gate because of the heater $h_1$ or $h_2$ which is working at all times, such that the injection molding operation can conveniently be peformed as in the case with the above thereby repeating the same operation successively thereafter.

The concrete structure of the present invention is described in detail with reference to FIGS. 3 to 12 in order to clarify the same.

FIGS. 3 to 8 illustrate the case where the means for heating the gate 8 employs a so-called external heating system and FIGS. 9 to 12 the case where it employs a socalled internal heating system.

Accordingly, the structure is first described with reference to FIGS. 3 to 8 based on the external heating system.

Portions which are the same as or corresponding to the embodiments illustrated in FIG. 1 giving the basic structure are denoted by the same codes with the detailed description thereof being omitted.

In these embodiments, a cylindrical runner tip body A through which a runner 7 is vertically pierced is disposed into the metal mold 3. In two embodiments illustrated in FIGS. 3, 4, 5, and 6, the outer periphery of the runner 7 is provided with a heater 10; the extended portion 16a of the heater 10 is provided in the vicinity of the gate 8 in Figs. 3 and 4 and another heater 17 is provided in FIG. 6. In embodiments illustrated in FIGS. 7 and 8, the heater is omitted, a heat pipe 18 is disposed in the outer periphery of the runner 7 and the thermal energy is always applied to the gate 8 for being capable of heating. A cooling medium-employing intermittent cooling mechanism 13 of a structure which is the same as that given in FIGS. 1 and 2 is provided in the runner tip body A along the outer periphery of the gate 8.

In these drawings, numerals 19, 20, and 21 denote an air gap, a position-correcting ring, and the lead wire of a temperature sensor provided in the runner tip body A, respectively.

In the above structure, the detailed description of the cooling medium-employing intermittent cooling mechanism 13 is omitted because it acts in the same manner as those described in the above embodiments.

The structures illustrated in FIGS. 9 to 12 in which the basic structure is the same as that in FIG. 2 are described below.

Portions which are the same as or corresponding to those in FIG. 2 and the above-described embodiments are omitted with the detailed description thereof being omitted.

The embodiments are different from the embodiments illustrated in FIG. 2 in that the cooling medium-employing intermittent cooling mechanism is provided in the tip 10 in all the cases.

Figure 10:
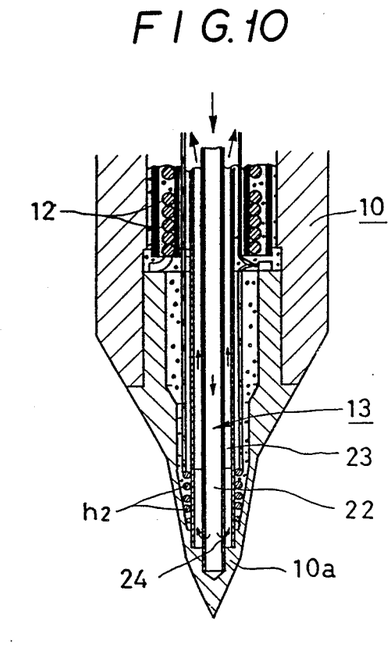
FIGS. 10 and 12: main portion-enlarged cross-sectional views corresponding to the above FIGS. 9 and 11.
Figure 11:
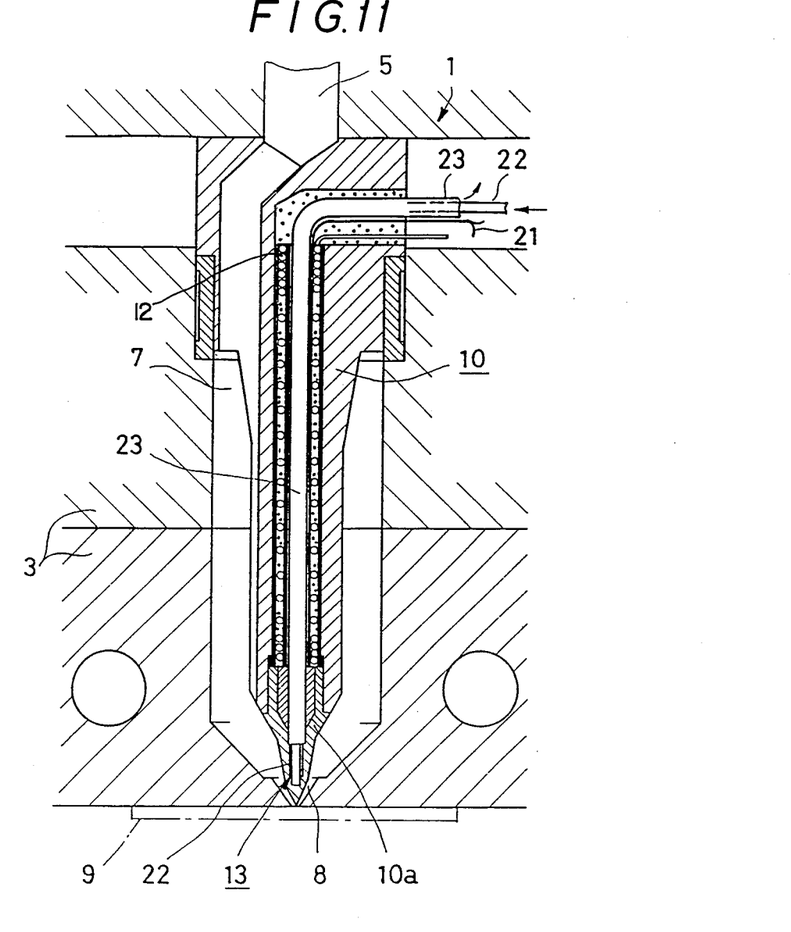
Figure 12:
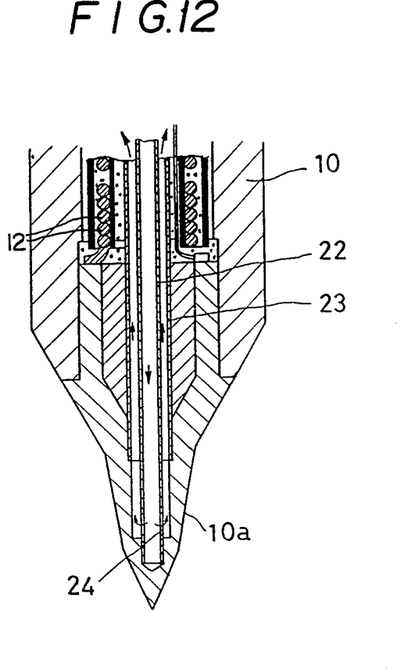

A cooling medium is allowed to flow from a flow path 22 at the center of dual pipe passages 22 and 23 and transferred to a flow path 23, FIG. 10, in the outer periphery from an opening 24 at the front end of at tip 10, whereupon the sharp end 10a of the tip 10 can rapidly be cooled. Although a heater h₂ is contained in and wound around the sharp end 10a and constructed separately from a body heater 12 in FIGS. 9 and 10, it may be processed and molded from a highly thermoconductive metal such as cooper which is heated by the surplus heat of the heater 12 as illustrated in FIGS. 11 and 12.

In the above-described structure, the repeated description of the cooling medium-employing intermittent cooling mechanism 13 is omitted because its action is quite the same as that in FIG. 2.

According to the runnerless injection molding method in the present invention, the gate is continuously heated, and a cooling-medium is intermittently fed into the cooling-medium employing intermittent cooling mechanism to cool the same corresponding to the action thereof for every injection molding operation whereby the resin in the gate is cooled and solidified for enabling the closing of the gate. When the feeding of the cooling medium is stopped, the gate is re-heated to melt the solidified resin in the gate for enabling the opening of the gate. Accordingly, a so-called high precision molding processing and simplification of the structure are possible and the intermittent heating means of the heater can be omitted unlike conventional methods, such that the electric control is simplified to be capable of reduced costs.

What is claimed is:

1. A method for runnerless injection molding of a synthetic resin which comprises injecting a molten resin from a runner through a gate into a cavity in a mold-compacting state using injection means, removing the molded product in the cavity in a mold-separating state after cooling and solidification of the resin, and returning the cavity to a mold-compacting state thereby repeatedly and continuously performing the injection molding operation using the injection means, wherein the molten resin is continuously heated by a first heater heating separately the runner and by a second heater heating constantly only the gate, while said resin is intermittently cooled and solidified in the gate only using a cooling medium during every injection molding operation while said gate is constantly heated by said second heater.

2. A method for runnerless injection molding of a synthetic resin in accordance with claim 1 wherein the molten resin in the gate is intermittently cooled and solidified using the cooling medium in the exterior of the gate.

3. A method for runnerless injection molding of a synthetic resin in accordance in claim 1 wherein the molten resin in the gate is intermittently cooled and solidified using the cooling medium in the interior of the gate.

4. A runnerless synthetic resin-injection molding apparatus having an intermittent cooling system which comprises a metal mold mechanism composed of a resin melting mechanism, and an injection mechanism, the flow path of the molten resin including a runner having a first heater for continuously heating said runner, and a plural number of component elements through which a gate having a second heater for continuously heating said gate only and a mold cavity are pierced; and a cooling medium-employing an intermittent cooling mechanism by which the heated gate is intermittently cooled using a cooling medium for enabling solidification of the molten resin in the gate.

5. A runnerless synthetic resin-injection molding apparatus having an intermittent cooling system in accordance with claim 4, wherein the cooling medium-employing the intermittent cooling mechanism is so constructed that a flow path of the cooling medium extends through a component member of the metal mold mechanism constituting the gate to intermittently feed the cooling medium into a gate-cooling portion of the component member provided on the outer periphery of the gate for every injection molding operation thereby cooling the gate portion from the exterior thereof.

6. A runnerless synthetic resin-injection molding apparatus having an intermittent cooling system in accordance with claim 4, wherein the cooling medium-employing the intermittent cooling mechanism is so constructed that it includes a tip body provided on the runner having a front end portion, said tip body front end portion is in close proximity to the gate, and the cooling medium is intermittently fed into a gate cooling portion provided at the said front end portion of the tip body for every injection molding operation, thereby cooling the gate from the interior thereof.

* * * * *